(12) United States Patent
Caves

(10) Patent No.: US 6,266,343 B1
(45) Date of Patent: *Jul. 24, 2001

(54) TELECOMMUNICATIONS SYSTEM

(75) Inventor: Keith Caves, Herts (GB)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,227

(22) Filed: Jul. 22, 1997

(51) Int. Cl.[7] .................. H04J 3/16; H04J 3/22
(52) U.S. Cl. ............ 370/466; 370/395; 370/474
(58) Field of Search ............... 370/395, 465, 370/466, 467, 474, 394, 442, 426, 469, 470, 471, 473, 476

(56) References Cited

U.S. PATENT DOCUMENTS

| | | | |
|---|---|---|---|
| 5,467,342 | * 11/1995 | Logston et al. | 370/17 |
| 5,526,349 | * 6/1996 | Diaz et al. | 370/58.1 |
| 5,548,587 | * 8/1996 | Bailey et al. | 370/60.1 |
| 5,570,362 | * 10/1996 | Nishimura | 370/60.1 |
| 5,638,365 | * 6/1997 | Duault et al. | 370/395 |
| 5,680,401 | * 10/1997 | Gayton et al. | 370/474 |
| 5,712,853 | * 1/1998 | Mathur et al. | 370/467 |
| 5,740,173 | * 4/1998 | Fiorini | 370/394 |
| 5,768,274 | * 6/1998 | Murakami et al. | 370/395 |

* cited by examiner

*Primary Examiner*—Ajit Patel
*Assistant Examiner*—Brian Nguyen
(74) *Attorney, Agent, or Firm*—Lee, Mann, Smith, McWilliams, Sweeney & Ohlson

(57) ABSTRACT

Structured data traffic is transmitted from a first to a second narrow band network via first and second ATM networks having respective first and second adaptation layers, e.g. AAL1 and AAL2. The traffic is segmented on egress from the first ATM network is encapsulated for transport across the second ATM network so as to preserve the structure information of the data traffic. The narrow band networks may be time division multiplex networks.

6 Claims, 5 Drawing Sheets

Fig. 2 *Prior Art*

TELECOMMUNICATIONS SYSTEM

This invention relates to a system and method for the transport of voice or data traffic over a telecommunications network.

BACKGROUND OF THE INVENTION

A recent innovation in telecommunications technology ha s been the introduction of the asynchronous transfer mode (ATM) transmission protocol. In this technique, information to be transmitted is loaded into packets or cells each of which is provided with a header containing information that is used for routing the cell to its correct destination. The header packet or cell may also contain other protocol control information relating to the cell payload and, in particular may include a cell sequence number so that cells received at a destination, possibly via different routes, may be unpacked in the correct order to recover the payload contents. The sequence number can also be used to indicate missing cells.

As the technique h as developed, ATM networks have evolved to handle different types of traffic, for example narrow band voice, wide band video and low bit-rate multi-user. Each particular network traffic type is adapted to its traffic content an ATM network by the use of an ATM adaptation layer (AAL) a number of which have been defined. For example, ATM adaptation layer type 1 (AAL-1) enables the transfer of n ×64 kbit/s structured data between source and destination whilst preserving the structure information, ATM adaptation layer type 2 (AAL2) provides the ability to encapsulate, multiplex and transport packets of user information inside an ATM cell stream, and so on.

With increasing volumes and variety of traffic, there is now a need for interworking between services supported by different adaptation layers. In particular, there is a need to transmit traffic across ATM networks of different types.

SUMMARY OF THE INVENTION

It is an object of the invention to provide an arrangement and method for transmitting traffic from one ATM network to another ATM network of a different type.

It is a further object of the invention to provide an arrangement and method for transmitting traffic between narrow band networks via first and second ATM networks.

According to the invention there is provided a method of transmitting structured data traffic from a first asynchronous network to a second asynchronous network, the first and second networks having respective first and second adaptation layers, the method including segmenting the traffic on egress from the first network, and encapsulating the segmented traffic on ingress to the second network whereby to preserve the structure information of said data traffic.

According to another aspect of the invention there is provided an arrangement for transmitting structured data traffic from a first asynchronous network to a second asynchronous network, the first and second networks having respective first and second adaptation layers, the arrangement including means for segmenting the traffic on egress from the first network, and means for encapsulating the segmented traffic on ingress to the second network whereby to preserve the structure information of said data traffic.

According to a further aspect of the invention there is provided a method of transmitting structured data traffic from a first narrow band network to a second narrow band network via an ATM network configuration comprising a first ATM network embedded within a second ATM network, the method including adapting the structured data traffic into a first format on ingress to the first ATM network and transporting the adapted data across that network, converting the adapted data into a second format for transport and switching via the second ATM network, reconverting the adapted data from the second format to the first format, transporting the adapted data to the second narrow band network via the first ATM network, and converting the formatted data back to structured data on egress from the first ATM network.

The structured data can incorporate voice signals which have been digitised and which are in e.g. a TDM format.

BRIEF DESCRIPTION OF THE DRAWINGS

Embodiments of the invention will now be described with reference to the accompanying drawings in which.

DESCRIPTION OF PREFERRED EMBODIMENT

Figure 1:
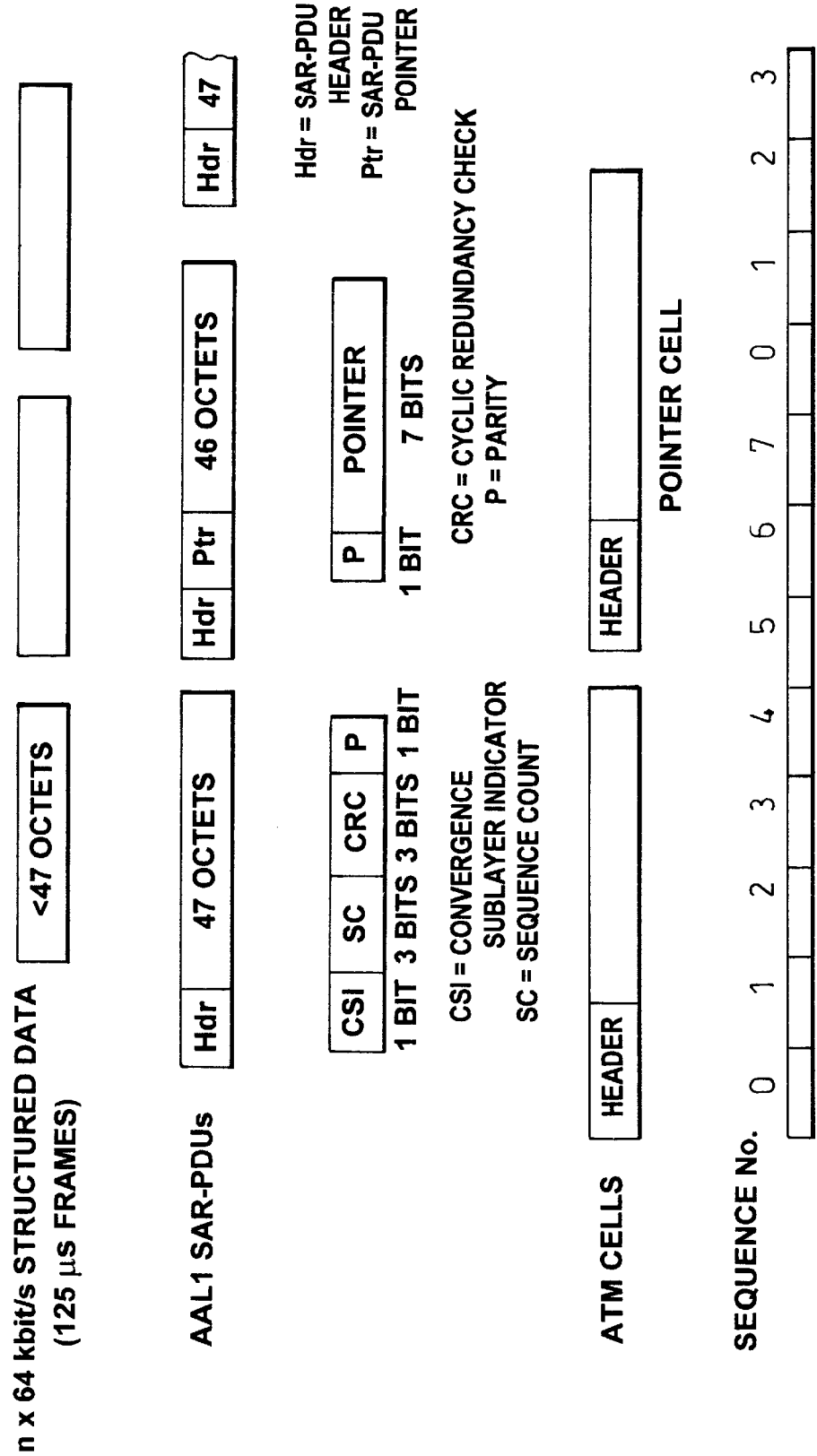
FIG. 1 is a schematic diagram illustrating the structure of the ATM adaptation layer 1 (AAL-1)

Referring first to FIG. 1 which is introduced for explanatory purposes, the ATM Adaptation Layer Type 1 (AAL1) enables the transfer of n×64 kbit/s structured data between source and destination whilst preserving the structure information. In other words, where a repetitive frame of 'n' channels is to be transported every 125 microseconds, information indicating the start of frame is also transported so that the exact frame structure may be recovered at the destination.

FIG. 1 shows the process used by AAL1 to provide the structured data transfer (SDT) capability. Frames of n×64 kbit/s structured data arrive for transport every 125 microseconds. The example shows frames of less than 47 octets, so that consecutive octets from adjacent data structures are concatenated to form the payloads for consecutive AAL1 SAR-PDUs. For frames longer than 47 octets, the process is similar, with consecutive octets from one or two data structures being concatenated to form the payloads.

The AAL1 SAR-PDU always starts with a 1-octet header containing the four fields shown. In addition, a SAR-PDU pointer field of 1-octet is inserted immediately after the Header by the transmitter once in every cycle of eight cells, but only when the sequence count value in the SAR-PDU header is even. The figure shows AAL1 SAR-PDUs containing the pointer field, located in AAL1 cells with sequence number values equal to 2 in this example. The presence of the pointer field is indicated by the value '1' carried by the CSI field of the SAR-PDU header. At all other times, i.e. for all odd values of sequence count and for even values of sequence count in non-Pointer cells, the CSI field is set to '0'. Note that the presence of the SAR-PDU pointer reduces the length of the SAR-PDU payload from 47 to 46 octets in those cells in which it appears.

The pointer is used at the first opportunity in a cycle of eight cells to indicate the first start of the structured block of n×64 kbit/s channels following the end of the pointer field.

This enables the start of the block structure to be recovered reliably at the receiver.

Figure 2:
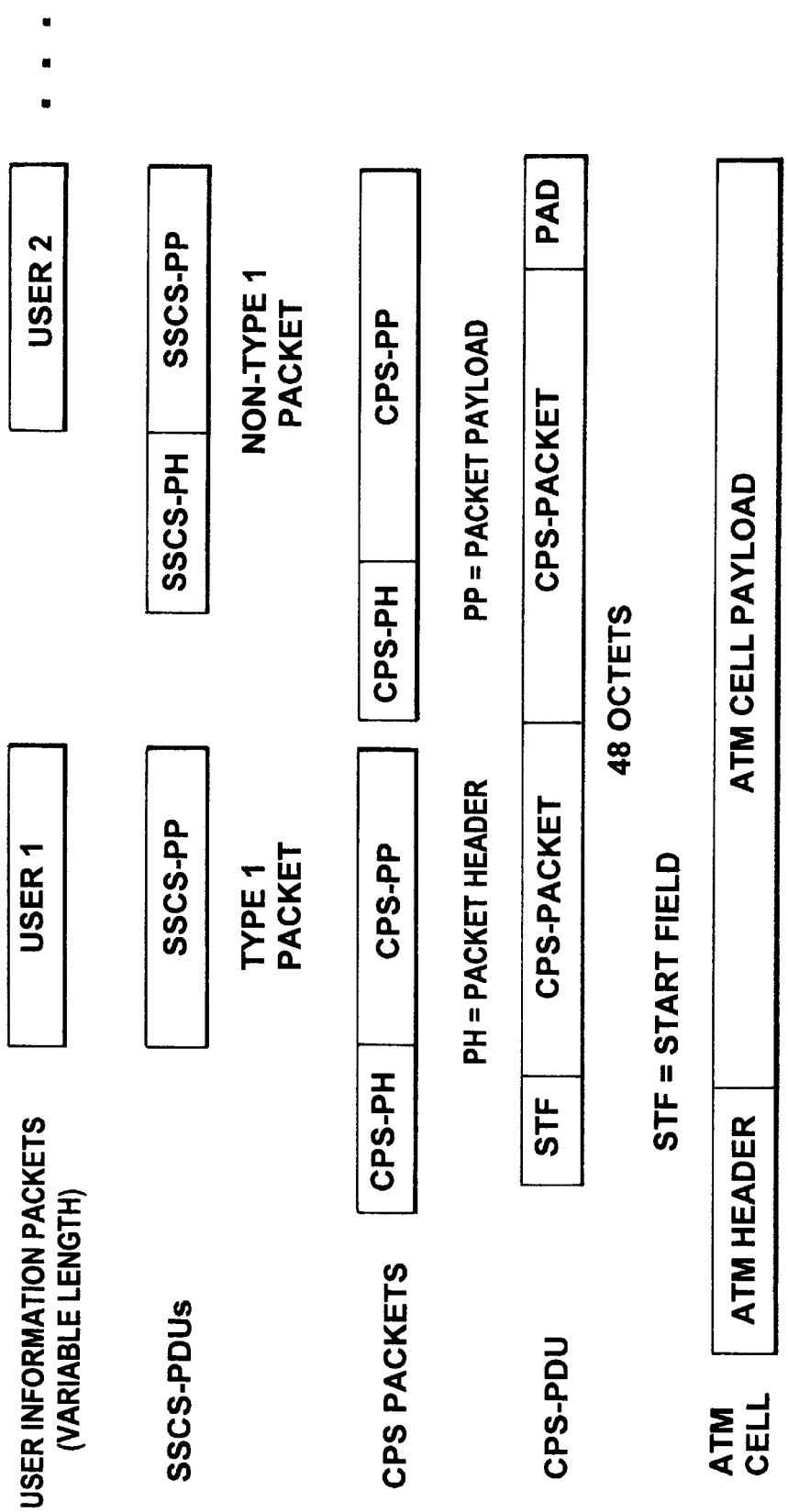
FIG. 2 is a schematic diagram illustrating the structure of the ATM adaptation layer 2 (AAL-2)

Referring now to FIG. 2 which is also introduced for explanatory purposes, the ATM Adaptation Layer Type 2 (AAL2) provides the ability to encapsulate and transport packets of user information inside an ATM cell stream, Packets from multiple users may be multiplexed onto a single ATM connection. These user packets consist, typically, of compressed voice information and vary in size from a few octets upwards, depending on the encoding algorithm in use. AAL2 permits packets of up to 45 octets to be carried by default with optional length of 64 octets. Longer packets must be segmented in a service specific convergence sublayer (SSCS) function prior to being handed down to the common part sublayer (CPS) of AAL2.

FIG. 2 shows the sequence of operations involved in the AAL2 packet transfer process used to encapsulate user packets into an ATM cell stream. As shown, user information packets of variable length are encapsulated into SSCS-PDUs. For the majority of information packets carried by AAL2, which will be routine voice (or voice and data) packets, the SSCS function is essentially null. This type of packet is referred to as Type 1 in FIG. 2 and involves no addition of SSCS packet header (SSCS-PH) to the Type 1 packet. The UUI (user to user information) field in the CPS packet header identifies the Type 1 packets by means of one or more code point values. Other packet types (e.g. Types 2, 3 and 4) are possible in which extra protocol control information and/or error protection is a requirement. FIG. 2 identifies this latter type of packet as 'non-Type 1'. The resulting extra fields appear in the SSCS-PH and the corresponding packet types are again identified as such by specific code points of the CPS packet header UUI field.

Following the SSCS process, the SSCS-PDUs are then encapsulated into CPS packets by the addition of CPS packet headers. A CPS packet thus consists of a CPS packet Header (CPS-PH) and a CPS packet payload (CPS-PP). The latter field has a length of from 1 to 45 (default maximum) octets. The CPS-PH of 3 octets consists of the following 4 fields:

CID=Channel Identifier (8 bits)
LI=Length Indicator (6 bits)
UUI=User-to-User Information (5 bits)
HEC=Header Error Check (5 bits).

One or more CPS packets are concatenated and a start field (STF) plus possibly a padding field are added as shown to form the CPS-PDUs, which are the fixed length 48 octet ATM cell payloads.

Figure 3:
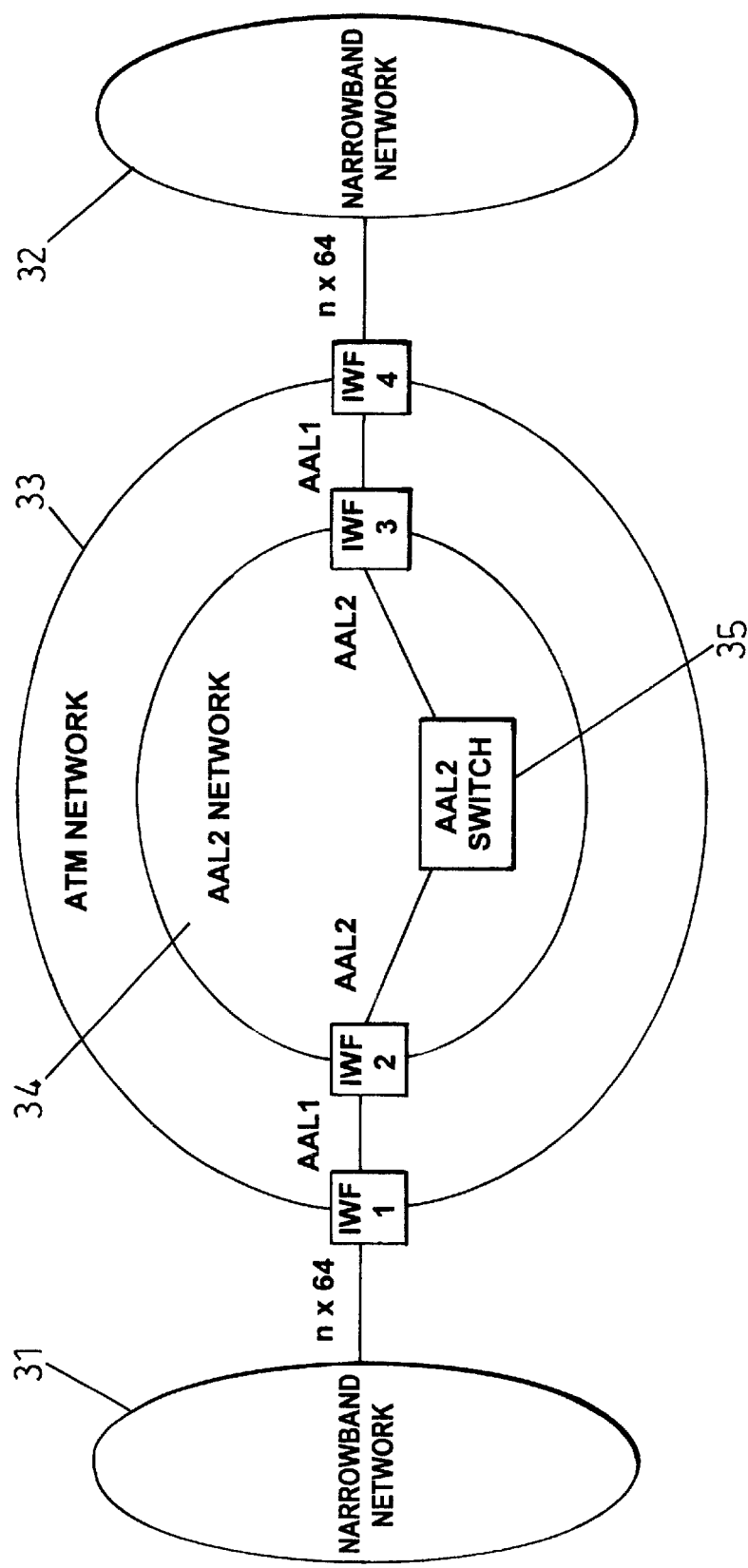
FIG. 3 shows an arrangement according to an embodiment of the invention for providing interworking between AAL1 and AAL2 networks.

FIG. 3 now shows an arrangement in which information being carried on an AAL1 cell stream is converted to an AAL2 cell stream. As shown in the figure, the arrangement provides for the transfer of structured data between narrow band networks 31, 32 via concatenated 'pure' ATM (33) and AAL2 -based (34) ATM networks. Typically, the narrow band networks 31 and 32 will be time division multiplex (TDM) networks carrying voice and/ or data traffic. Switching of traffic within the AAL2 -based network is performed by AAL2 switch 35. At the Interworking Function (IWF 1) between the narrow band network and the ATM network, the n×64 kbit/s structured data is adapted using the SDT (structured data transfer) mechanism of AAL1. The structured data is then transported across the ATM network to the interworking function IWF 2 located at the boundary between the ATM network 33 and the AAL2 network 34. Here, the AAL1 structured data is converted by the interworking function IWF 2 to a suitable format for transport and switching by means of AAL2. On the other side of the AAL2 network 34, at the interworking function IWF 3, the data is converted back for transport via AAL1 over the 'pure' ATM network 33 to the interworking function IWF 4. Here, the structured data is converted back to its original TDM (time division multiplex) format for transport within the destination narrow band network.

There are a number of options by which the AAL1 structured data may be converted for transport via AAL2. Two preferred options involving segmentation of the AAL1 SAR-PDUs (segmentation and reassembly-protocol data units) are discussed below.

Figure 4:
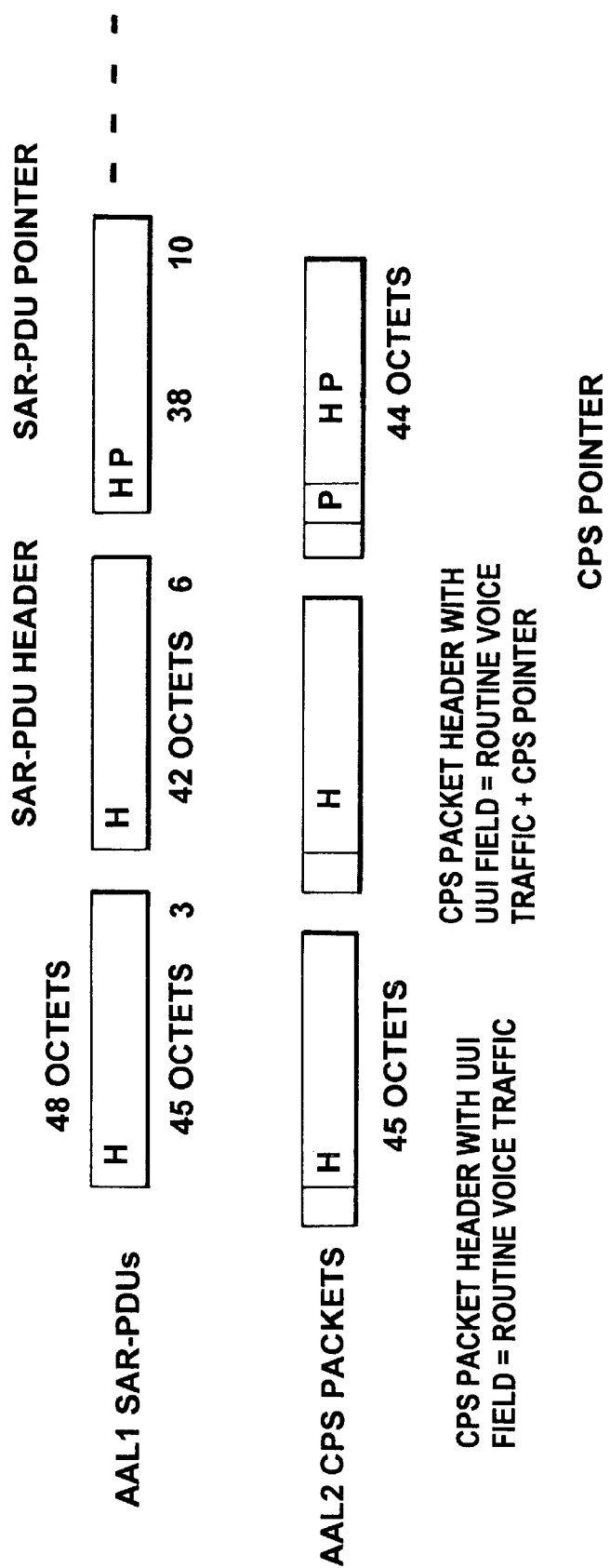
FIG. 4 illustrates a first method of mapping AAL1 to AAL2 in the network arrangement of FIG. 3.

In this the first arrangement illustrated in FIG. 4, the stream of AAL1 SAR-PDUs is segmented in a simple manner and then encapsulated for transport by the AAL2 CPS. As shown in FIG. 4, the 48 octet AAL1 SAR-PDUs (segmentation and reassembly-protocol data units) are segmented as required to enable their formation into the maximum (default) size 45 octet AAL2 CPS packets. This entails concatenating 45 octets from one or two consecutive AAL1 SAR-PDUs and adding an AAL2 CPS (common part sublayer) header field of 3 octets to form the CPS packets. The figure shows the AAL1 segments being loaded into consecutive AAL2 packets; however, it will be appreciated that packets from other applications can be interposed in the AAL2 packet stream. This in no way affects the AAL1 segmentation process, since the any AAL2 packet carrying the AAL1 segments only carries segments from the same source. These segments are identified as such belonging to a given source by means of the unique value of the CID field carried in their AAL2 packet headers.

A requirement of the above segmentation process is that of identifying the start of a structured block of data within the AAL2 CPS packets. In AAL1, this identification is accomplished by the pointer field carried in every cycle of 8 cells as explained previously. However, the above segmentation process now causes the AAL1 SAR-PDU pointer to appear asynchronously to the start of the AAL2 packets carrying the AAL1 segments. Therefore, it is necessary to carry a further CPS pointer in the AAL2 CPS packet stream whose function is to locate the start of the AAL1 SAR-PDU pointer field. For this purpose, in addition to the Type 1 UUI code point(s) identifying routine voice (or voice and data) traffic, an extra unique UUI code point is used to signify routine traffic plus CPS pointer. The octet immediately following the CPS header carrying the new UUI codepoint is then used as the CPS pointer which locates the SAR-PDU pointer within the CPS packet. The data structure can thus be recovered at the receiver by reference to the SAR-PDU pointer.

In a second embodiment, the stream of AAL1 SAR-PDUs is segmented such that the AAL1 SAR-PDU pointer is guaranteed to be synchronous with the start of the AAL2 CPS packets. This process is illustrated in FIG. 5.

Figure 5:
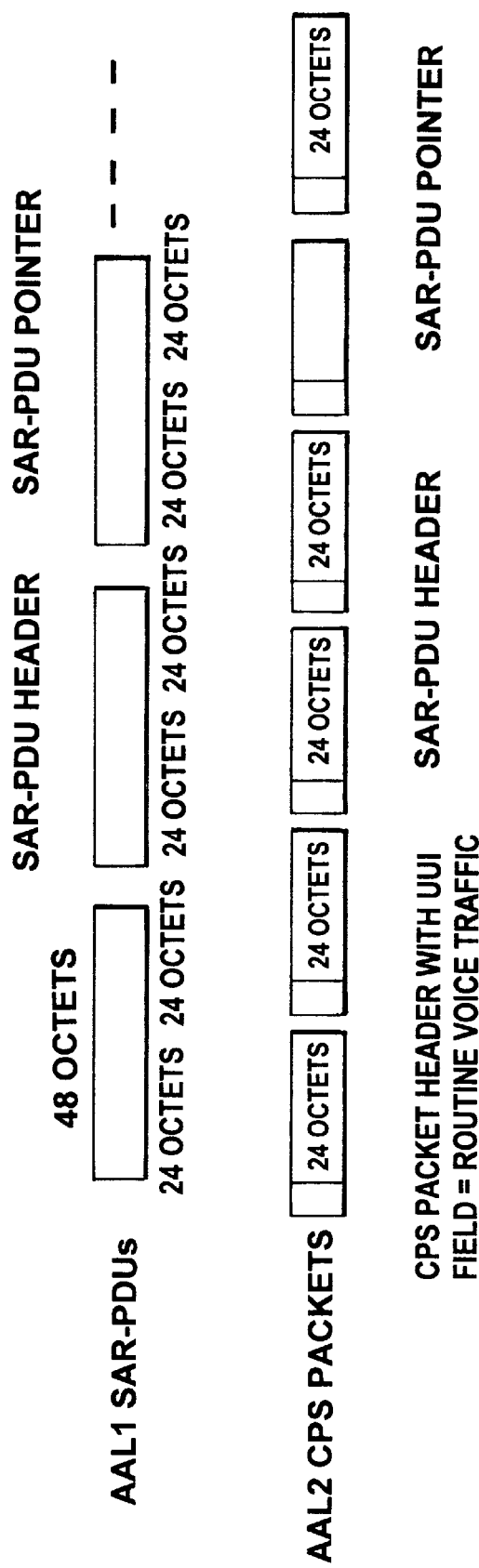
FIG. 5 illustrates a second method of mapping AAL1 to AAL2 in the network arrangement of FIG. 3.

As shown in FIG. 5, the 48 octet AAL1 SAR-PDUs are segmented into 24 octet equal length segments. To each segment, an AAL2 CPS packet header is appended to form 27 octet long CPS packets. This segmentation process guarantees that the SAR-PDU pointer always occupies the second octet position that follows an AAL2 CPS packet header (the first octet position being occupied by the AAL1 SAR-PDU header).

Clearly, in the process of FIG. 5, the AAL1 SAR-PDU headers only appear in every second AAL2 CPS packet. However, the UUI fields in the CPS headers contain a sequence number of some modulus, e.g. 2 or 4 or 8 or 16. By ensuring that the SAR-PDU headers only appear in CPS packets containing even sequence numbers (or odd sequence numbers—it only matters that the transmitter and receiver both agree on which) the SAR-PDU Pointer can always be located at the receiver. This is simply a matter of identifying the SAR-PDU Headers with a CSI field carrying the value '1'. The SAR-PDU pointer is then located in the octet immediately following the header field and enables the data structure to be recovered at the receiver.

This segmentation process can be extended to segment lengths other than 24. Where the maximum AAL2 packet length is the default of 45 octets, any segment length that is a whole number divisor of 48 can be used successfully, except 48 itself (48 octet segments can be used in cases where the default maximum AAL2 packet length is 64 octets). For any segment length created by this rule, the result is that the AAL1 SAR-PDU header appears every 'N' AAL2 CPS packets, where 'N' is the integer divisor which provides the segment length. Again, providing that the SAR-PDU headers only appear in CPS packets with even sequence numbers, the SAR-PDU pointer can be recovered at the receiver.

Recovery may be simplified by ensuring that, at the start of transmission, the SAR-PDU Header appears in the CPS packet with sequence number '0' (or some other known value of sequence number). This provides a ready index from which counting to determine the position of the SAR-PDU pointer every 'N' packets can be carried out. However, note that the case of the 48 octet segments is special—here, the SAR-PDU header appears in every CPS packet, which makes the recovery of the SAR-PDU pointer particularly straightforward It will be understood that although the technique has been described above with particular reference to use with the AAL1 and AAL2 adaptation layers, it is of more general application. It will also be understood that various modifications and alterations might be made by those skilled in the art without departing from the spirit and scope of the invention.

I claim:

1. A method of transmitting narrow bond structured date traffic comprising a number of frames or blocks from a first narrow band time division multiplex (TDM) network to a second narrow band TDM network over an asynchronous network arrangement incorporating a first ATM network having a first adaptation layer protocol and arranged to transport said TDM traffic in first fixed length cells to provide end to end structural data transport of said TDM traffic, said first ATM network having embedded therein a second ATM network having a second adaptation layer protocol providing multiplexing of packets from a plurality of users onto a single ATM connection and arranged to transport second fixed length ATM cells, the method including adapting the structured data traffic into a first ATM fixed length cell format conforming to said first adaptation layer protocol on ingress to the first ATM network by segmenting the traffic into first ATM cells, providing within selected first ATM cells a first pointer indicative of the start of a frame or block of said structured data, transporting the first ATM cells containing the adapted structured data across that first ATM network to said second ATM network, converting the adapted structured data into a second ATM fixed cell format for transport, multiplexing and switching via the second ATM network and inserting in said second ATM cells further pointers indicative of the location of said first pointers, reconverting the adapted data from the second ATM format to the first ATM format using said further pointers to identify the positions of said first pointers, transporting the adapted data to the second narrow band network via the first ATM network, and converting the adapted data back to the original structured data on egress from the first ATM network using said first pointers to identify the start of each said block or frame.

2. A method as claimed in claim 1, wherein the structured data traffic is segmented into common part sublayer (CPS) packets, each said packet being provided with a header field comprising three octets.

3. A method as claimed in claim 2, wherein said first ATM network is an adaptation layer one (AAL1) network and said second network is an adaptation layer two (AAL2) network.

4. A method of transmitting narrow band structured data traffic comprising a number of frames or blocks from a first narrow band time division multiplex (TDM) network to a second narrow band TDM network over an asynchronous network arrangement incorporating a first ATM network having a first adaptation layer protocol and arranged to transport said TDM traffic in first fixed length cells to provide end to end structured data transport of said TDM traffic, said first ATM network having embedded therein a second ATM network having a second adaptation layer protocol providing multiplexing of packets from a plurality of users onto a single ATM connection and arranged to transport second fixed length ATM cells, the method including adapting the structured data traffic into a first fixed length ATM cell format conforming to said first adaptation layer protocol on ingress to the first ATM network by segmenting the traffic into first ATM cells, providing within selected first ATM cells a pointer indicative of the start of a frame or block of said structured data, transporting the first ATM cells containing the adapted structured data across that first ATM network to said second ATM network, converting the adapted structured data into second ATM cells in fixed cell format for transport, multiplexing and switching via the second ATM network such that each said pointer is located at a fixed position in every other one of said second ATM cells, reconverting the adapted data from the second ATM cell format to the first ATM cell format, transporting the adapted data to the second narrow band network via the first ATM network, and converting the adapted data back to the original structured data on egress from the first ATM network using said pointers to identify the start of each said block or frame.

5. A method as claimed in claim 4, wherein the structured data traffic is segmented into common part sublayer (CPS) packets, each said packet being provided with a header field comprising three octets.

6. A method as claimed in claim 5, wherein said first ATM network is an adaptation layer one (AAL1) network and said second network is an adaptation layer two (AAL2) network.

* * * * *